C. A. JAQUA.
FRICTIONAL AIR COMPRESSOR.
APPLICATION FILED AUG. 7, 1909.

975,957.

Patented Nov. 15, 1910.

Witnesses
C. N. Walker.
James R. Mansfield.

Inventor
Charles A. Jaqua
By Alexander Fowl, Attorneys

UNITED STATES PATENT OFFICE.

CHARLES AVERY JAQUA, OF PORTLAND, INDIANA.

FRICTIONAL AIR-COMPRESSOR.

975,957.   Specification of Letters Patent.   Patented Nov. 15, 1910.

Application filed August 7, 1909. Serial No. 511,792.

*To all whom it may concern:*

Be it known that I, CHARLES A. JAQUA, of Portland, in the county of Jay and State of Indiana, have invented certain new and useful Improvements in Frictional Air-Compressors; and I hereby declare that the following is a full, clear, and exact description thereof, reference being had to the accompanying drawings, which form part of this specification.

This invention is an improved air pump or compressor, particularly designed for use on automobiles, and adapted to be secured adjacent to the fly-wheel of the motor thereof, so that it can be driven by frictional contact therewith when desired and furnish compressed air for inflating the pneumatic tires of such vehicle.

The invention consists in the novel construction and arrangement of parts wherein the driving crank wheel of the pump is mounted on a pivotal support so that it can be swung relatively to the cylinder into or out of contact with the fly-wheel of the engine, and the cylinder is adjustably mounted so that it can be set at any desired angle to the fly-wheel, and whereby on the compression stroke of the pump the piston will be operated in the most advantageous manner.

I will describe the invention with reference to the accompanying drawings in which—

Figure 1:
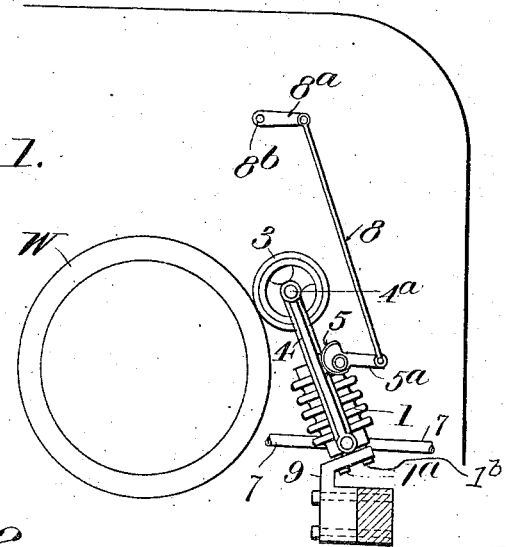
Figure 2:
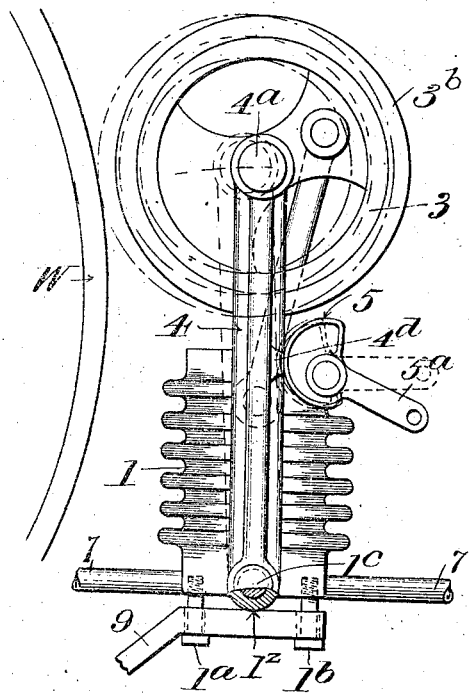
Figure 3:
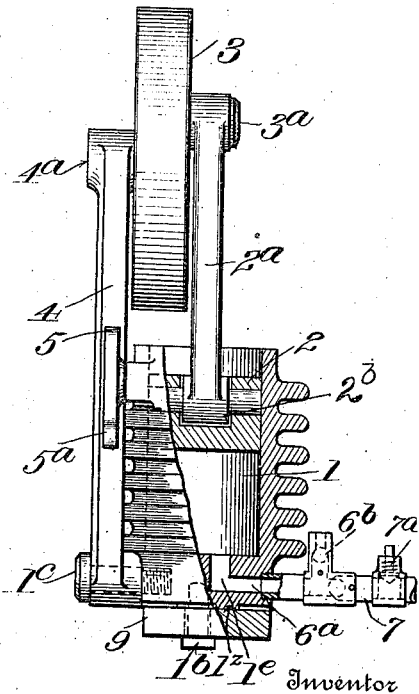

Figure 1 is a side elevation of the apparatus in position for use. Fig. 2 is an enlarged side view thereof. Fig. 3 is a front view of Fig. 2, partly in section.

The pump comprises a cylinder 1 which may be ribbed for strengthening and air cooling same, and which is open at one end and closed at the other end, by which end it is supported on a bracket 9 attached to the running gear of an automobile (not shown); said cylinder being adjustably secured to the bracket 9 by means of bolts 1$^a$, 1$^b$, passed through said support and tapped into recesses in the closed end of the cylinder. Said bolts 1$^a$, 1$^b$, are so arranged, that by loosening one bolt and tightening the other the cylinder 1 (which may have a bearing on the bracket intermediate the bolts as indicated in Fig. 2) can be tilted relatively to the support 9 and secured in any position to which it is adjusted. This enables the cylinder to be adjusted angularly relatively to the fly-wheel W of the motor (not shown).

Within the cylinder 1 is a piston 2 connected to a pitman rod 2$^a$, which is in turn connected to a crank pin 3$^a$ on a fly wheel 3 journaled on a stud 4$^a$ attached to a swingable lever 4, which is pivoted at its lower end on a bolt 1$^c$ attached to the cylinder as shown. This enables the crank-wheel 3 and consequently pitman 2$^a$ (which is pivotally connected to the piston as indicated at 2$^b$) to be vibrated or swung so as to move the periphery of crank wheel 3 into contact with the motor fly wheel W as indicated in dotted lines Fig. 2, so that motion will be imparted to the piston from wheel 3 when the latter is actuated by frictional contact with fly wheel W. Preferably the wheel 3 has a facing 3$^b$ of leather or other suitable frictional material. Lever 4 can be swung so as to move crank wheel 3 to and from fly wheel W, by suitable means. As shown a cam 5 is pivotally mounted beside the lever 4 on a pin 1$^d$ attached to the cylinder 1. This cam 5 engages a finger 4$^d$ on the side of lever 4, and the cam is so formed that when it is rocked in one direction the lever 4 is moved so as to bring wheel 3 forcibly into contact with wheel W, whereupon the piston will be reciprocated, and when the cam is thrown in the opposite direction the lever 4 is moved so as to separate wheel 3 from wheel W whereupon the pump is stopped.

The cylinder 1 has a port 1$^e$ in its lower end to which is connected a pipe 6 provided with an inlet 6$^a$, having a check valve 6$^b$, and through which air can be drawn into the pump-cylinder. The pipe 6 is connected to a pipe 7 which may be led to any suitable point on the machine from which it can be conveniently connected by rubber tubing to the tire to be inflated. At a suitable point a relief valve 7$^a$ may be placed in pipe 7 so that when the desired pressure in the tire tubes has been obtained this valve will pop and notify the operator, and also prevent excessive pressure in the tire. The cylinder is so adjusted, when secured to an automobile, that when lever 4 is moved to bring the crank wheel 3 into contact with wheel W the pitman 2$^a$ on the down or working stroke of the piston will be practically in line with the axis of the cylinder at the time of the greatest compression; thus obtaining the effect of an offset crank which gives increased power. The pipe 7 might be branched as indicated in Fig. 1 beyond the pop valve 7$^a$ and extended to the front and rear of the automobile in convenient position for attachment of the rubber tubing in a well understood manner.

The cam 5 may be operated by hand, or it may be operated from any convenient point on the machine by means of a rod 8 connected to an arm 5ª on the cam, and to a crank 8ª on a shaft 8ᵇ, which can be shifted by a hand wheel or lever as desired, and which is so located and arranged that the pump can be thrown into or out of operation without having to raise the hood from the engine in order to start or stop the compressor. In this construction the cylinder is adjustable relatively to the periphery of the fly wheel and the crank wheel is mounted on a pivoted support which can be moved to shift the fly wheel without disturbing the cylinder, and the air pipes are not in motion while the compressor is running.

The invention while particularly designed for automobiles, is also useful in many cases where it may be desired to compress air intermittently from the engine or fly wheel of an engine or other motor. The pump could also be located adjacent any driven wheel and operated thereby, as it is operated from the fly wheel W.

Having described my invention, what I claim as new and desire to secure by Letters Patent thereon is:

1. In an air compressing apparatus for automobiles and the like, the combination with the fly wheel of the motor, of an air pump beside the fly wheel comprising a cylinder adjacent the motor fly wheel, a piston therein, a lever pivoted beside and on the cylinder, a crank wheel journaled in the free end of said lever, a pitman pivotally connected to the piston and said crank wheel, a cam pivoted in the cylinder for shifting the lever, and a pipe for conducting air from the pump to the tire.

2. An air compressor for automobiles and the like comprising a cylinder adapted to be supported adjacent the fly wheel of a motor, a support for said cylinder, bolts securing said cylinder to said support and whereby it can be adjusted angularly relatively to the periphery of the fly wheel, a lever pivoted to and beside said cylinder, a crank wheel mounted on the free end of said lever and movable thereby into or out of contact with the fly wheel of the motor, a piston in said cylinder, a pitman pivotally connected to said piston and to said crank wheel, a valved air pipe connected with the closed end of said cylinder, a cam pivoted on the cylinder and engaging said lever, and means for operating said cam so as to move the crank wheel into or out of engagement with the fly wheel of the motor.

In testimony that I claim the foregoing as my own, I affix my signature in presence of two witnesses.

CHARLES AVERY JAQUA.

Witnesses:
 RUSSELL L. BROUSE,
 ROY O. POTTS.